(12) United States Patent
Tian et al.

(10) Patent No.: US 9,438,332 B2
(45) Date of Patent: Sep. 6, 2016

(54) LOW COST PROXIMITY PAIRING MECHANISM IN WIRELESS PERSONAL AREA NETWORKS

(71) Applicant: ROBERT BOSCH GmbH, Stuttgart (DE)

(72) Inventors: Yuan Tian, Fremont, CA (US); Lakshmi Venkatraman, Mountain View, CA (US); Michael Howells, San Jose, CA (US); Saeed Mehr, San Francisco, CA (US)

(73) Assignee: Robert Bosch GmbH, Stuttgart (DE)

( * ) Notice: Subject to any disclaimer, the term of this patent is extended or adjusted under 35 U.S.C. 154(b) by 521 days.

(21) Appl. No.: 13/728,960

(22) Filed: Dec. 27, 2012

(65) Prior Publication Data

US 2013/0171939 A1 Jul. 4, 2013

Related U.S. Application Data

(60) Provisional application No. 61/581,779, filed on Dec. 30, 2011.

(51) Int. Cl.
| | |
|---|---|
| *H04B 7/24* | (2006.01) |
| *H04W 52/16* | (2009.01) |
| *H04W 12/04* | (2009.01) |
| *H04W 52/50* | (2009.01) |
| *H04W 52/28* | (2009.01) |

(52) U.S. Cl.
CPC ............... *H04B 7/24* (2013.01); *H04W 12/04* (2013.01); *H04W 52/16* (2013.01); *H04W 52/283* (2013.01); *H04W 52/50* (2013.01)

(58) Field of Classification Search
USPC ....... 455/41.2, 522, 426.1, 550.1, 419, 41.1; 340/539.23, 539.11, 10.1, 573.1
See application file for complete search history.

(56) References Cited

U.S. PATENT DOCUMENTS

| | | | |
|---|---|---|---|
| 7,848,703 B1 * | 12/2010 | Beard et al. ................. | 455/41.2 |
| 8,190,189 B2 * | 5/2012 | Lerke ............................ | 455/522 |
| 2003/0050009 A1 * | 3/2003 | Kurisko et al. ................. | 455/41 |
| 2004/0209639 A1 * | 10/2004 | Kamperschroer et al. .... | 455/522 |
| 2006/0003700 A1 * | 1/2006 | Yasuda et al. ............... | 455/41.2 |
| 2006/0056636 A1 * | 3/2006 | Schrum, Jr. .................. | 380/273 |
| 2010/0133436 A1 * | 6/2010 | Rosener .................. | 250/339.06 |
| 2010/0255782 A1 * | 10/2010 | Klemmensen ............... | 455/41.2 |

(Continued)

OTHER PUBLICATIONS

International Preliminary Report on Patentability corresponding to PCT Application No. PCT/US2012/071882, mailed Jul. 10, 2014 (10 pages).

*Primary Examiner* — Nay A Maung
*Assistant Examiner* — Erica Fleming-Hall
(74) *Attorney, Agent, or Firm* — Maginot Moore & Beck LLP

(57) ABSTRACT

A wireless networking method includes placing a master device and at least one peripheral device within proximity of each other. A radio frequency request for proximity pairing is transmitted from the peripheral device to the master device. Radio frequency proximity pairing signals implementing the proximity pairing are transmitted from the master device to the peripheral device. The proximity pairing signals are transmitted with a first level of transmission power. After the proximity pairing is complete, operational signals are transmitted from the master device to the peripheral device. The operational signals are transmitted with a second level of transmission power greater than the first level of transmission power.

18 Claims, 6 Drawing Sheets

(56) References Cited

U.S. PATENT DOCUMENTS

| | | | |
|---|---|---|---|
| 2010/0318578 A1* | 12/2010 | Treu et al. | 707/802 |
| 2012/0003932 A1* | 1/2012 | Zhodzishsky | 455/41.2 |
| 2012/0271380 A1* | 10/2012 | Roberts et al. | 607/60 |
| 2013/0169434 A1* | 7/2013 | McCown et al. | 340/540 |
| 2013/0172045 A1* | 7/2013 | Caballero et al. | 455/552.1 |
| 2013/0253951 A1* | 9/2013 | Richter et al. | 705/3 |

* cited by examiner

LOW COST PROXIMITY PAIRING MECHANISM IN WIRELESS PERSONAL AREA NETWORKS

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright © 2010, Robert Bosch GmbH, All Rights Reserved.

BACKGROUND OF THE INVENTION

1. Field of the Invention

The present invention relates to a wireless network, and, more particularly, to a method of wireless network initialization.

2. Description of the Related Art

Proximity pairing is not supported in the current ZigBee (IEEE 802.15.4) standard. Although Bluetooth v2.1+EDR provides an optional NFC (Near Field Communication) mechanism for proximity pairing, it needs additional hardware support. Thus, Bluetooth v2.1+EDR is most likely of higher cost.

In most wireless networks, it is critical to have a secure and reliable mechanism to set up a network, and to enable new legitimate network devices to join an established network. In most networks with coordinators (masters), a new network device (e.g., slave or peripheral device) needs to register, associate, and authenticate with the coordinators in order to join the network. This process is also broadly referred to as a "pairing" process between the master and the peripheral devices.

For devices with limited human machine interface or healthcare applications targeting senior citizen customers, a "proximity pairing" mechanism provides significant benefit. With proximity pairing, a user can simply power on a peripheral device, and bring the device into close proximity to a master device. The peripheral device and the master device are automatically paired when they are close enough to each other, or after acquiring an optional confirmation from the user.

Almost all of the existing industrial wireless standards have addressed the association/pairing mechanisms with considerable emphasis on the security and privacy issue. However, the proximity pairing mechanism is not broadly available: ZigBee does not have an embedded proximity pairing capability. For Bluetooth, proximity pairing is available only for its latest version Bluetooth v2.1+EDR. However, Bluetooth v2.1+EDR requires NFC (Near Field Communication), which needs additional hardware support. Such additional hardware results in increased cost.

U.S. patent application publication 2008/0227393, entitled "Method and system for pairing of wireless devices using physical presence" by J. Tang, E. Hankey, and E. Stanford, filed on Mar. 14, 2007, and published on Sep. 18, 2008 discloses techniques that facilitate pairing of wireless devices with other wireless devices. According to one embodiment, a pairing process can be secured through use of physical proximity. However, the disclosed techniques require verification of the closeness of the two devices (master and peripheral devices) before the devices can be paired. After the proximity check is successful, the two devices can continue with the normal network operation, such as a regular association/pairing procedure. Such an approach needs to "cut in" the regular pairing process, which involves significant development effort and may introduce security vulnerability. The communication during the proximity check purely relies on the (proprietary) software developer. However, the software developer may not investigate reliability and security of the system to its full extent.

Although the underlying wireless communication mechanisms to pair a peripheral device with a coordinator could be complicated, it is highly desirable to present a simple yet reliable and secure process from the user experience perspective. This is especially true for devices with limited HMI (Human Machine Interface), or consumer and healthcare applications.

In most of the existing wireless standards, there are several parameters to indicate the strength of the link established between two connected devices, such as a master device and a peripheral device. These parameters are either an indication of the received signal strength, RSSI (Received Signal Strength Indicator), or an indication of the link quality, LQI (Link Quality Indicator), which normally considers both received signal strength and the packet success rate over the link. In most of the implementations, these parameters are measured as an average over a period of time.

What is neither disclosed nor suggested by the prior art is a method of implementing proximity pairing between two devices without the high cost and additional hardware required by known methods.

SUMMARY OF THE INVENTION

The present invention provides a method for implementing proximity pairing using existing wireless personal area networks (PAN) technology without incurring additional hardware cost. The invention provides a simple and reliable method of setting up a wireless personal area network. The proximity pairing method may use existing industrial wireless communication standards, such as ZigBee, Bluetooth, and WiFi. The invention may provide a system commissioning mechanism that regulates a new device reliably. The system commissioning mechanism joins the network with limited human machine interface and user intervention requirements.

The present invention provides proximity pairing to enhance the user experience without additional hardware requirements. The invention exploits existing standards' features with minimum user intervention for the lower level standard operation.

The method of the present invention does not require expensive hardware, but rather is implemented on top of existing wireless standards with embedded industrially accepted security mechanisms. Since the proximity check may be conducted after pairing establishment, all necessary communication can be done at the application layer with minimum development effort required. As a result, the existing mechanisms, hardware and software can be leveraged by developing on top of these existing systems. Therefore, the approach of the present invention is more cost efficient and much more reliable and secure.

The invention comprises, in one form thereof, a wireless networking method including placing a master device and at least one peripheral device within proximity of each other. A radio frequency request for proximity pairing is transmitted from the peripheral device to the master device. Radio frequency proximity pairing signals implementing the proximity pairing are transmitted from the master device to the peripheral device. The proximity pairing signals are transmitted with a first level of transmission power. After the proximity pairing is complete, operational signals are transmitted from the master device to the peripheral device. The operational signals are transmitted with a second level of transmission power that is greater than the first level of transmission power.

The invention comprises, in another form thereof, a wireless networking method including performing a standard wireless pairing procedure between a master device and a peripheral device. The wireless pairing procedure includes the master device transmitting standard pairing signals to the peripheral device with a first level of transmission power. Radio frequency proximity pairing signals implementing proximity pairing are transmitted from the master device to the peripheral device. The proximity pairing signals are transmitted with a second level of transmission power that is less than the first level of transmission power.

The invention comprises, in yet another form thereof, a wireless networking method including periodically transmitting synchronization beacons from a master device. The master device and a peripheral device are placed within twenty feet of each other. At least one of the synchronization beacons from the master device is received at the peripheral device. A radio frequency request for proximity pairing is transmitted from the peripheral device to the master device. A level of transmission power in the master device is reduced for proximity pairing. A radio frequency request for confirmation of the radio frequency request for proximity pairing is transmitted from the master device to the peripheral device. Node identification information and security information is transmitted from the master device to the peripheral device. After the proximity pairing is complete, the level of transmission power in the master device is increased for future communication with the peripheral device.

An advantage of the present invention is that it enhances the user experience during the wireless network initialization in a simple and reliable way, and with minimum user intervention.

Another advantage is that the inventive proximity check process may utilize existing wireless communication mechanisms of the underlying communication technologies.

Yet another advantage is that the invention may leverage the situation in which the receiving circuit is saturated and/or excessive readings of the RSSI and LQI occur to thereby implement a proximity check.

A further advantage is that the proximity pairing does not require user actions on the peripheral device side, such as pushing buttons, etc.

Still another advantage is that an additional peripheral device may be proximity paired to the master device at any future time after the initial network installation.

A still further advantage is that it is easy to proximity pair a peripheral device to a second master device after the peripheral device has already been proximity paired to a first master device.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
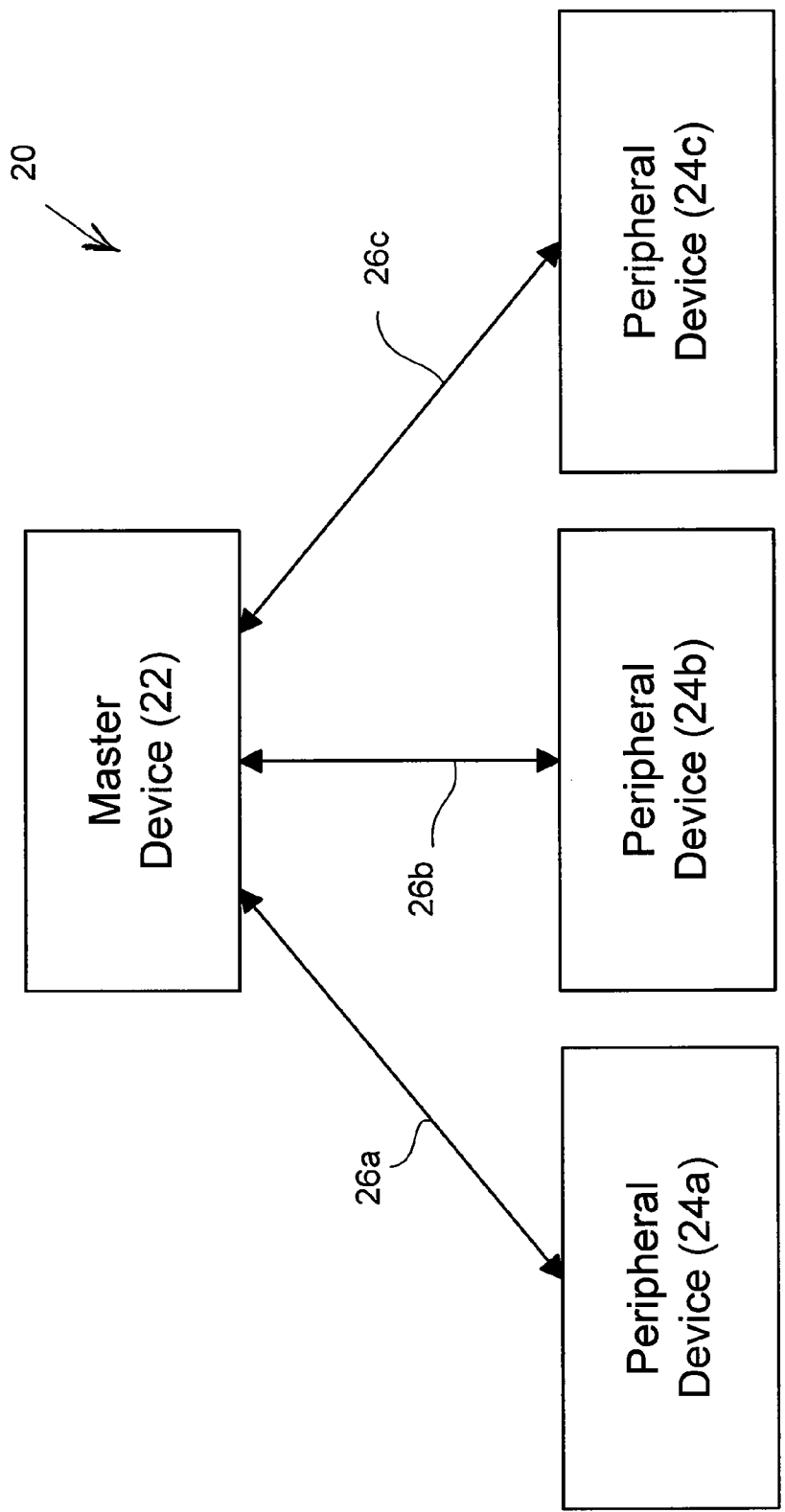
FIG. 1 is a block diagram of one embodiment of a wireless network suitable for use with the method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may be described herein in terms of algorithms within a computer. It has proven convenient, primarily for reasons of common usage among those skilled in the art, to describe the invention in terms of algorithms. It is to be understood, however, that these and similar terms are to be associated with appropriate physical elements, and are merely convenient labels applied to these physical elements. Unless otherwise stated herein, or apparent from the description, terms such as "performing", "increasing", "using", "decreasing", "transmitting", "reducing", "reporting", "replying", "looking for", "sending", "receiving" or "issuing", or similar terms, refer the actions of a computing device that may perform these actions automatically, i.e., without human intervention, after being programmed to do so.

Referring now to the drawings and particularly to FIG. 1, there is shown one embodiment of a wireless network 20 suitable for use in conjunction with the priority pairing method of the present invention. Network 20 includes a master device 22 wirelessly connected to a plurality of peripheral devices 24a-c, as indicated by wireless links 26a-c. Each of master device 22 and peripheral devices 24a-c may be battery powered.

Figure 2:
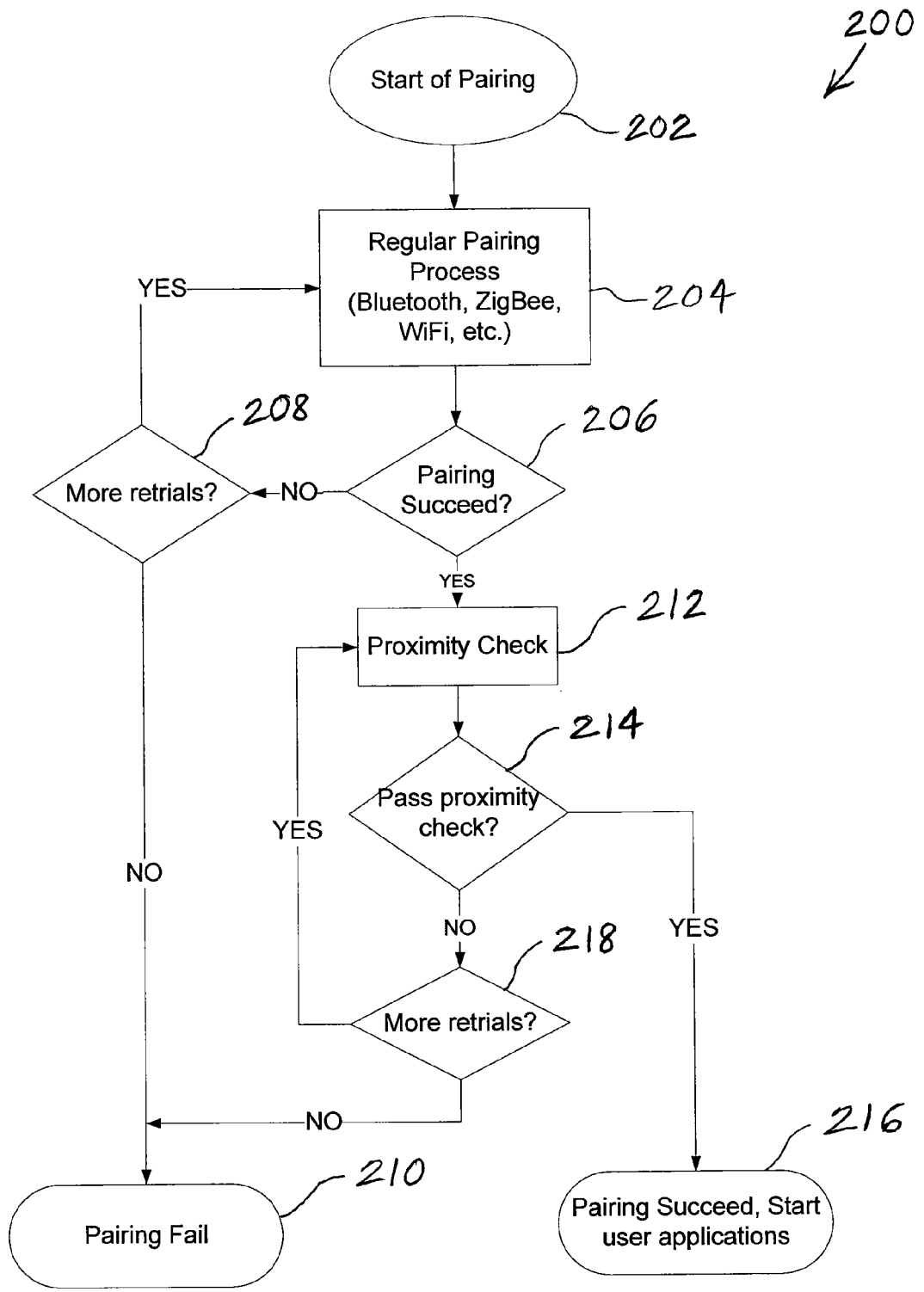
FIG. 2 is a flow chart illustrating one embodiment of a proximity pairing method of the present invention.

One embodiment of a proximity pairing method 200 of the present invention is shown in FIG. 2. In a first step 202, pairing begins between a master device and a peripheral device. Any master device and peripheral device that are within a short enough distance of each other may establish wireless communication between each other, as is conventionally known.

In a next step 204, a regular (e.g., conventional or standard) pairing process occurs to establish a communication protocol between the master device and the peripheral device. Such a pairing process may be implemented via a wireless communication specification or protocol such as Bluetooth, ZigBee, WiFi, etc.

Next, in step 206 it is determined whether the pairing process of step 204 was successful. For example, it may be determined whether communication has been successfully established between the master device and the peripheral device.

If it is determined in step 206 that the pairing process has not been successful, then operation proceeds to step 208, where it is determined whether the communication protocol calls for additional retrials, or re-tries to establish communication. If more retrials are called for, then operation returns to step 204, where the regular pairing process is repeated. However, if more retrials are not called for in step 208, then operation ceases and the pairing is deemed to have failed (step 210).

On the other hand, if it is determined in step 206 that the pairing process has been successful, then a proximity check is performed in step 212. For example, it may be determined based upon the wireless signals, as described in more detail below, whether the peripheral device is within a predetermined distance of the master device.

In step 214 it is determined whether the proximity check of step 212 has been passed. That is, it is determined whether the peripheral device is within the proximity of the master device.

If it is determined in step 214 that the proximity check has been passed, and the peripheral device is sufficiently close to the master device, then the pairing is deemed successful in step 216. The master device and the peripheral device may continue on with starting user applications (e.g., applications that benefit the user directly, rather than just establish communication between the master device and the peripheral device).

However, if it is determined in step 214 that the proximity check has been failed, and the peripheral device is too far from the master device, then it is determined in step 218 whether additional retrials (e.g., retries at checking proximity) are called for by the method of the invention. For example, in one specific embodiment, the proximity check may be performed three consecutive times, with operation returning to step 212 each time. If the check is successful in any of those three attempts, then operation proceeds to step 216 where the operation is deemed successful. After the predetermined number of retrials are exhausted with no successful proximity checks, then operation ceases and the pairing is deemed to have failed (step 210).

As shown in the flowchart of FIG. 2, proximity checking/pairing may occur after the two wireless devices (e.g., the master and peripheral devices) have established a mutual pairing by using the normal or conventional pairing/association process of the particular wireless technology that happens to be in use. Thus, the conventional pairing phase may be followed by the proximity pairing phase of the invention.

If a peripheral device fails to pass the proximity checking, then the master device may disconnect the connection established in the convention pairing process. The peripheral or "slave" device can also optionally disconnect itself from the network and/or from the master device in particular.

In one embodiment, implementation of the proximity check method of the invention is limited to the master device. In this way, the method of the invention is compliant with and consistent with other existing communication methods and systems, even if the same mechanism is not implemented on those systems.

With the observations as described above, the proximity checking method of the invention may be implemented as described below. The whole pairing process may be performed during a predefined time window after the user indicates the start of a process. In one embodiment, after the time window elapses, it may be no longer possible to pair a peripheral device with the master device unless the user restarts the process.

During the proximity checking process, the master device may send packets to the to-be-checked peripheral devices. The packets may be sent with a minimum level of transmission power. These packets may be referred to as "challenging packets" because they challenge the closeness of the receiving devices. The packets can be either user-defined packets at the application level, or some type of control packets that the receiving peripheral devices are mandated to respond to. One of the big advantages of lower transmission power is enhanced security. That is, with lower transmission power, the "challenging packets" are unlikely to be heard by unintended peripheral devices that are out of the proximity of the transmitting master device. This, in turn, lowers the security risk that a remote malicious device node is able to receive the transmission and pretend to be a nearby peripheral device that belongs in the network.

When sending "challenging packets", the master device can check its RSSI and/or LQI with the to-be-checked peripheral device. If one or both of the readings exceed a threshold level for a certain period of time, it can be concluded that the master device and the peripheral device are close enough to each other, and the proximity check is deemed to have succeeded.

The values of the threshold levels of RSSI and/or LQI that are selected may depend upon the different particular communication technologies being employed as well as the characteristics of the RF transmitters and receivers in the master device and the peripheral device. The values of the threshold levels of RSSI and/or LQI that are selected may also be dependent upon other RF configurations.

It sometimes occurs that a malicious external device node pretends to be a nearby device by artificially increasing its transmission power level in order to saturate the circuit. In order to avoid the network of the invention being fooled by such an imposter device, in one embodiment, the threshold values of RSSI and/or LQI are tested during installation with a peripheral device that is out of close proximity to the master device, but that is transmitting at the maximum power level. Thus, the threshold values of RSSI and/or LQI may be optimized with sufficient system testing during installation.

Figure 3:
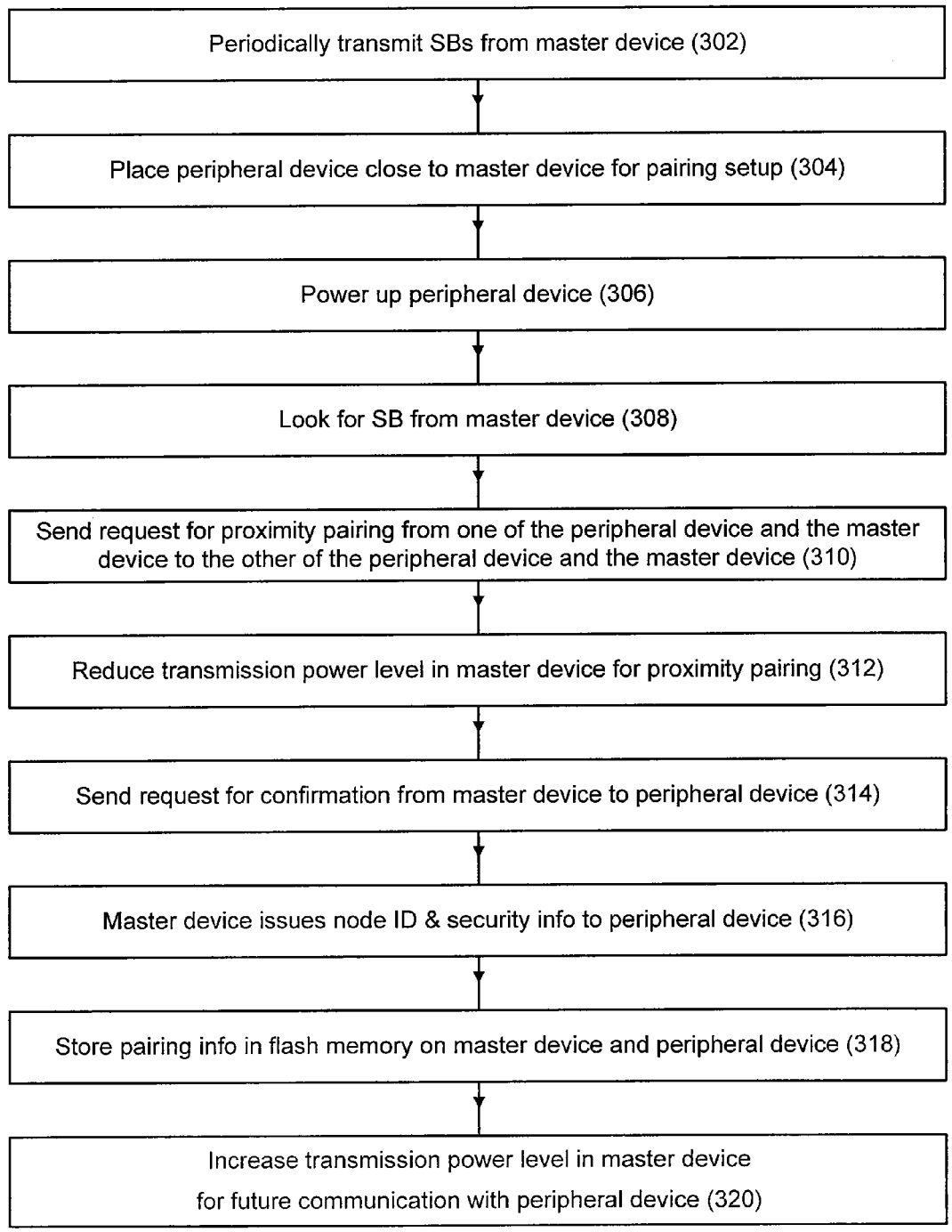
FIG. 3 is a flow chart illustrating another embodiment of a proximity pairing method of the present invention.

Another embodiment of a proximity pairing method 300 of the present invention is illustrated in FIG. 3. In a first step 302, a master device node periodically transmits synchronization beacons (SBs) to any peripheral device nodes that are within reception range. The aim is that the SBs are received by peripheral devices that intend to be included in the wireless network of the master device.

In a next step 304, a user places a peripheral device in proximity of the master device for proximity pairing setup. Proximity may be, for example, within about three to twenty feet of the master device. The user places the peripheral device in proximity of the master device with the intention that the peripheral device be proximity paired with the master device and become a part of the master device's network.

Next, in step 306, electrical power is applied to the peripheral device. In one embodiment, the peripheral device is battery powered, and the battery power is applied by actuating a switch.

In a next step 308, the pairing setup stage is entered. More particularly, the peripheral device is manufactured with the ability to recognize a synchronization beacon, and thus begins receiving radio frequency signals and searches for synchronization beacons among the received signals.

After finding a synchronization beacon from the master device in step 308, one of the peripheral device and the master device wirelessly transmits a request to the other of the master device and the peripheral device requesting that proximity pairing take place (step 310). The request may include an identifier of the master device, wherein the identifier was included in the synchronization beacon. The request may also include an identifier of the peripheral device that transmits the request, and this identifier may describe what type of device the peripheral device is.

Next, in step 312, the level of transmission power by the master device is temporarily reduced for purposes of setting up proximity pairing. For example, the master device may begin to transmit signals with a level of power such that the signals may typically be received by only receiver nodes that are in proximity of the master device. In a specific example, the master device may begin to transmit signals with a level of power such that the signals may typically be received by only peripheral devices that are within twenty feet of the master device. Thus, the reduced transmission power avoids eavesdropping by external wireless nodes that might otherwise being able to receive the master device transmissions if they were to be transmitted with a normal level of power.

In step 314, a signal asking for confirmation of the proximity pairing request is transmitted from the master device to the requesting peripheral device. After the peripheral device receives the signal from the master device, the peripheral device may prompt a human user to confirm that he does indeed desire the proximity pairing. For example, a message may be presented to the human user on a user interface of the peripheral device. The message may be presented in text on a display screen of the user interface, and/or the message may be in spoken audible form and played on an audio speaker of the user interface. The user may input his confirmation into the user interface, which also may be in the form of a text or oral message. In response to receiving the confirmation from the user, the peripheral device may transmit a confirmation signal to the master device.

Next, in step 316, after receiving the confirmation of the proximity pairing request from the peripheral device, the master device may transmit another low power signal to the peripheral device including information needed by the peripheral device in order to participate in the master device's network. In one embodiment, the signal from the master device includes an assigned identification number for the peripheral device as well as security information such as a password and/or encryption protocol that the peripheral device is to use in initiating and continuing communication with the master device. The signal from the master device may further include frequency channels and/or a frequency hopping sequence that the peripheral device and master device are to follow during their communications.

In step 318, both the master device and the peripheral device store proximity pairing information on respective flash memories within the devices. For example, the proximity pairing information may include the assigned identification number for the peripheral device, the security information, and the frequency channel information that was transmitted by the master device in step 316. The peripheral device may further store the identification information for the master device.

In a final step 320, now that the proximity pairing setup is completed, the master device may increase its level of transmission power back to its normal level. With the transmission power of the master device at a higher level, there is less chance of error in the form of the peripheral device not correctly receiving a transmission. Although it may be possible for some external node to receive the master device's signals at this higher transmission power, the external device may still be unable to maliciously participate in the network since the external device is not recognized as belonging in the network.

There may be a need for maintenance of the proximity pairing during normal network operation, as the proximity paired peripheral device may be asleep for most of the time during normal network operation. Part of the information transmitted from the master device to the peripheral device upon the completion of the proximity pairing is a re-startup protocol to be followed when the peripheral device awakens from its sleep state. Following such a re-startup protocol, the peripheral device, when powered up a user, may synchronize and communicate with the master device, exchanging stored pairing information back and forth.

Figure 4:
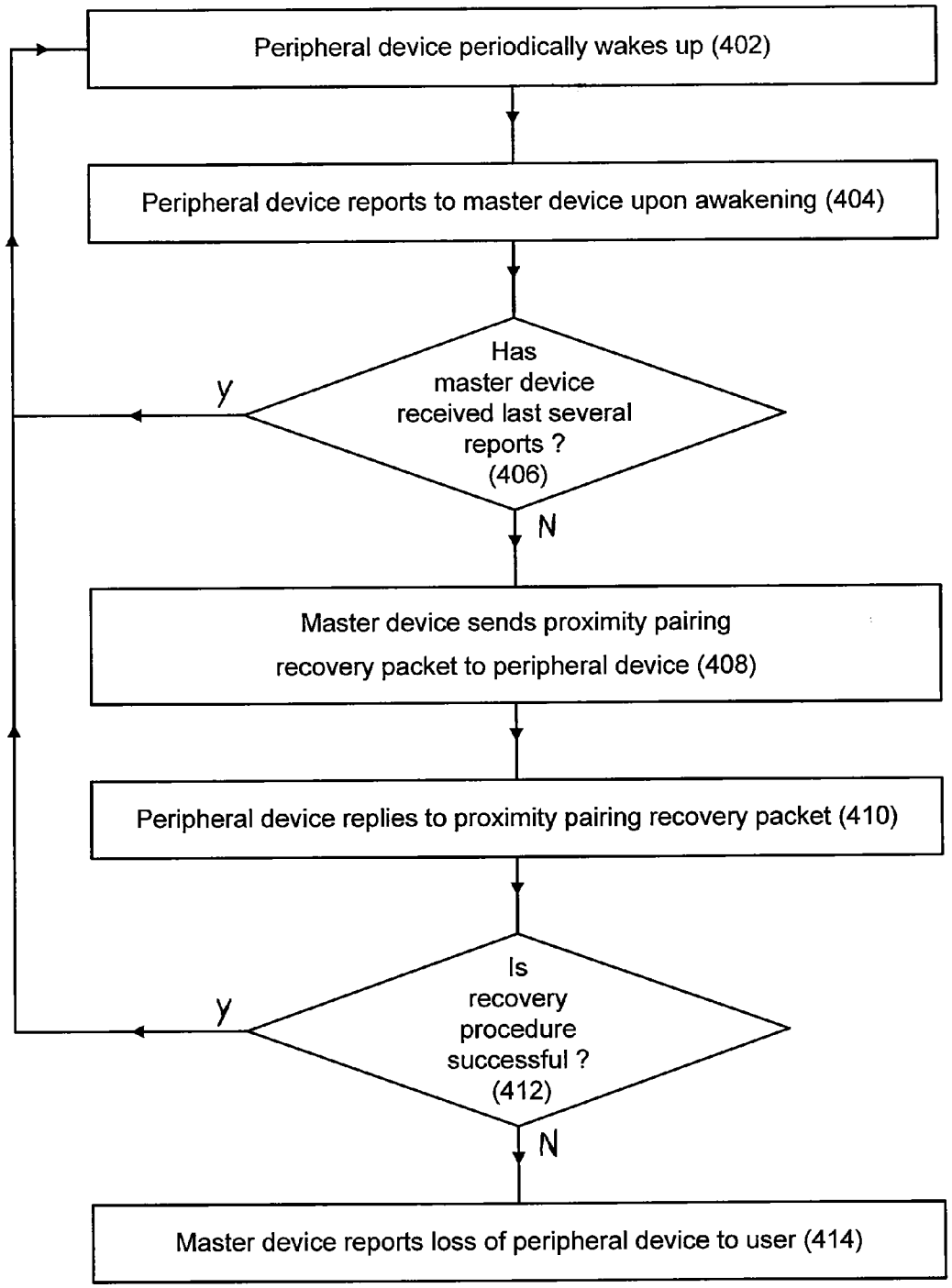
FIG. 4 is a flow chart illustrating one embodiment of a proximity pairing maintenance method of the present invention.

Illustrated in FIG. 4 is a proximity pairing maintenance method 400 that may be followed during the idle time of the network. In a first step 402, the peripheral device periodically wakes up. The length of time that the peripheral device stays asleep may be maximized in order to increase battery life. However, the longer the peripheral device stays in a sleep state and out of communication with the master device, the more likely it may be that there will be difficulty in re-establishing communication between the master device and the peripheral device. Thus, there may be a trade-off between battery life and reliability of communication. In one example embodiment, the peripheral device wakes up every few minutes.

In a next step 404, the peripheral device reports to the master device upon awakening. For example, the peripheral device may report to the master device the identity of the peripheral device as well as the content of the last signal that the peripheral device received from the master device. Thus, the master device can confirm that the peripheral device received the most recent transmission from the master device.

Next, in step 406, the master device periodically confirms that it has received the last several reports that were due from the peripheral device. For example, if the peripheral device is set up to report to the master device every four minutes, then the master device may evaluate every fifteen to twenty minutes or so whether the master device has received the last four reports from the peripheral device. Alternatively, the master device may check, immediately after a report from a peripheral device is due, whether the master device has received any of the four previously scheduled reports from the peripheral device.

If it is decided in step 406 that the master device has indeed received at least one of the last several reports due from the peripheral device, then operation returns to step 402, where the peripheral device continues its cycle of periodically waking up and reporting to the master device. If, however, it is decided in step 406 that the master device has not received at least one of the last several reports due from the peripheral device, then it may be the case that proximity pairing between the master device and the peripheral device has been lost, and the master device may proceed to step 408 to initiate a procedure to re-establish the proximity pairing.

In step 408, the master device transmits a proximity pairing recovery packet to the non-reporting peripheral device. This recovery packet may include all of the same information that was previously transmitted from the master device to the peripheral device in order to initiate proximity pairing, such as the assigned identification number for the peripheral device, the security information, and the frequency channel information that was transmitted by the master device in step 316 (FIG. 3). Again, this recovery packet may be transmitted from the master device at low transmission power, assuming that the peripheral device is still within proximity, in order to avoid the packet from being received by external devices. In another embodiment, the master device first transmits at full power a wake up signal containing no private information to the peripheral device. After the peripheral device acknowledges receipt of the wake up signal, and the master device hence knows that the peripheral device is still functioning (although not necessarily within proximity), then the master device transmits at reduced power the recovery packet with the private information to the peripheral device.

In a next step 410, the peripheral device, assuming that it is still functioning and still disposed within proximity of the master device so as to be able to receive the recovery packet, transmits a reply signal to the master device in response to receiving the proximity pairing recovery packet. The reply signal from the peripheral device may include the same information that was included in the recovery packet to thereby confirm that the entire recovery packet was correctly received by the peripheral device. The reply signal may also include the identification of the peripheral device.

Next, in step 412, it is determined by the master device whether the proximity pairing recovery procedure was successful. For example, was a proper reply from the peripheral device received by the master device in response to the transmission of the proximity pairing recovery packet by the master device? Does the reply from the peripheral device indicate that the peripheral device correctly received all of the information necessary to re-establish and continue communication between the master device and the peripheral device?

If it is determined in step 412 that the recovery procedure was successful, then operation returns to step 402, where the peripheral device continues its cycle of periodically waking up and reporting to the master device. If, however, it is decided in step 412 that the recovery procedure was not successful, then operation proceeds to step 414, where the master device reports the loss of the peripheral device to the user. For example, a message may be presented to the human user on a user interface of the master device. The message may be presented in text on a display screen of the user interface, and/or the message may be in spoken audible form and played on an audio speaker of the user interface. Alternatively, the master device may transmit the message to another one of the peripheral devices that is still in communication, and the peripheral device may relay the message to the user via the user interface of the peripheral device.

In response to receiving the report from the master device that communication with the peripheral device has been lost, the user may inspect the peripheral device to determine whether it is in need of repair or maintenance, such as a battery replacement. Alternatively, or in addition, it may be the case that the peripheral device has inadvertently been moved out of the proximity of the master device. In this case, the user may simply need to re-position the peripheral device within proximity of the master device (step 304; FIG. 3) and power up the peripheral device (step 306). After these steps, the proximity pairing method 300 of FIG. 3 may continue automatically.

As described above with respect to step 310 (FIG. 3), a peripheral device may broadcast a request-to-pair packet (RPP). The acknowledge signal (ACK) from the master device may carry the necessary pairing information (step 316), such as the network identification, the node identification, data security information, etc. The peripheral device may re-send the RPP if the peripheral device does not receive the ACK from the master device.

As also described above, the proximity pairing communication may use a minimum of transmission power. Thus, the peripheral devices must be close enough to the master device in order to be paired. In one embodiment, other devices in the vicinity, such as other, already-paired peripheral devices, may be powered down while the proximity pairing is in process. Otherwise, the proximity pairing communication might be interrupted by other devices which may not be blocked by the on-going proximity pairing communication. In another embodiment, in contrast, the proximity pairing process is delayed until the other devices cease their communication.

Different wireless technologies (e.g., Bluetooth, ZigBee, and 2.1+EDR) may be utilized with the method of the invention, and each technology has its corresponding advantages and disadvantages. The use of Bluetooth in conjunction with the present invention results in a relatively complicated pairing process. However, Bluetooth is compatible with many existing devices, as Bluetooth is widely accepted in certain industries, such as healthcare applications. ZigBee provides easy and secured pairing, reliable periodic communication, and quick recovery after disconnection.

Figure 5:
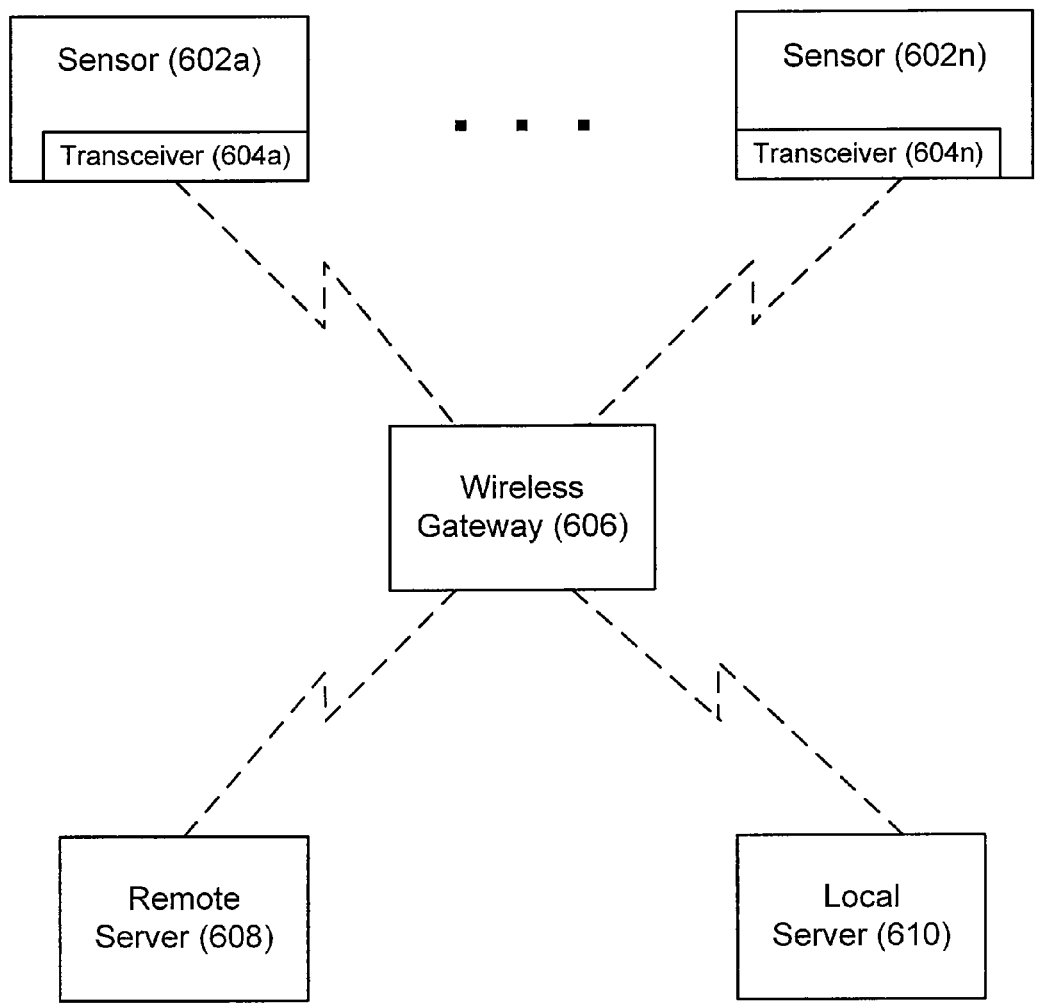
FIG. 5 is a block diagram of one embodiment of a mobile wireless gateway system of the present invention.

In one embodiment the present invention is implemented as a mobile wireless gateway system 600 (FIG. 5) for healthcare applications. System 600 includes a plurality of patient monitoring sensors $602_{1-n}$ each having a respective wireless transceiver $604_{1-n}$. A wireless gateway 606 may collect data from sensors $602_{1-n}$ and send data to a remote server 608 at a remote health care center and/or to a local server 610 at a local data processing center. In this way, system 600 may function as an information processing system that is used by healthcare professionals. Sensors $602_{1-n}$ and gateway 606 may be worn on the patient's body.

According to the invention, sensors $602_{1-n}$ may function as peripheral devices, and gateway 606 may function as the master device. Thus, sensors $602_{1-n}$ and gateway 606 may be brought into close proximity with each other on the patient's body, and the above-described proximity pairing process may be used to place sensors $602_{1-n}$ and gateway 606 in wireless communication with each other. The proximity pairing process of the invention may provide system 600 with a high level of data security and privacy as well as reliable communication. In one embodiment, gateway 606 communicates to remote server 608 via a cellular wide area network, and gateway 606 communicates with local server 610 via short range communication, such as WiFi, etc.

Figure 6:
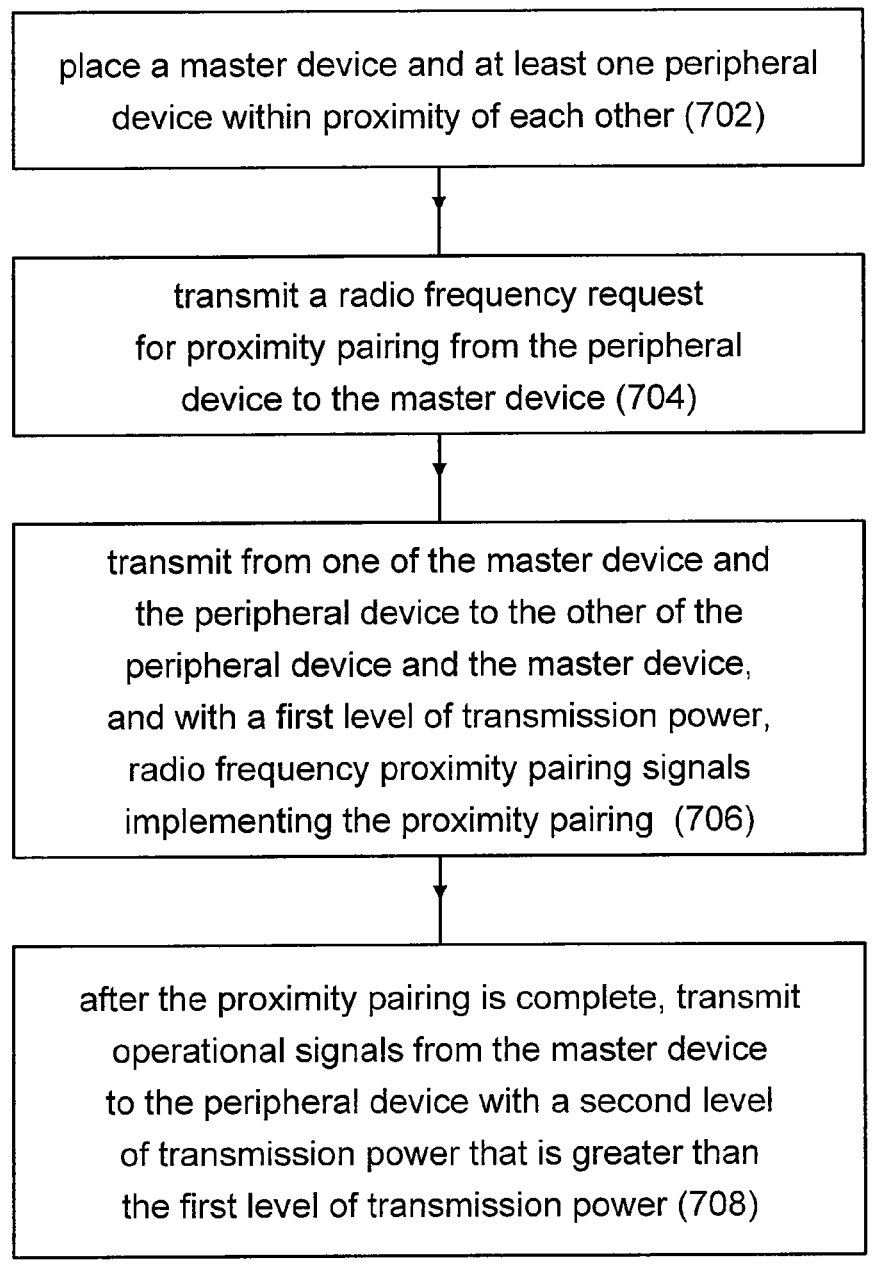
FIG. 6 is a flow chart illustrating one embodiment of a wireless networking method of the present invention.

FIG. 6 illustrates one embodiment of a wireless networking method 700 of the present invention. In a first step 702, a master device and at least one peripheral device are placed within proximity of each other. For example, a master device 22 and at least one of peripheral devices 24a-c may be placed within about twenty feet of each other in one embodiment.

In a next step 704, a radio frequency request for proximity pairing is transmitted from the peripheral device to the master device. For example, the request for proximity pairing may include identifiers of both the master device and the peripheral device. The peripheral device identifier may describe what type of device the peripheral device is.

Next, in step 706, radio frequency proximity pairing signals implementing the proximity pairing are transmitted from the master device to the peripheral device with a first level of transmission power. That is, the transmitter power output (TPO) of the master device may be set at a certain level of power such that the proximity pairing signals are not easily received outside of the proximity of the master device. The peripheral device identifier provided by the peripheral device in step 704 may be used by the master device in addressing the proximity pairing signals to the appropriate peripheral device. The proximity pairing signals may include the format and timing of operational signals that are to follow.

In a final step 708, after the proximity pairing is complete, operational signals are transmitted from the master device to the peripheral device with a second level of transmission power that is greater than the first level of transmission power. That is, after proximity pairing between the master device and the peripheral device is established, and the format and timing of operational signals that are to follow is understood by both the master device and the peripheral device, then the operational signals are transmitted from the master device to the peripheral device with an increased level of transmission power. More particularly, the operational signals are transmitted with a level of power that is greater than the level of power with which the proximity pairing signals were transmitted. Specifically, the transmitter power output of the master device may be greater when transmitting the operational signals than when transmitting the proximity pairing signals.

While this invention has been described as having an exemplary design, the present invention may be further modified within the spirit and scope of this disclosure. This application is therefore intended to cover any variations, uses, or adaptations of the invention using its general principles.

What is claimed is:

1. A wireless networking method, comprising the steps of:
   placing a master device and at least one peripheral device within proximity of each other;
   implementing a standard pairing process between the master device and the at least one peripheral device;
   transmitting a radio frequency request for proximity pairing from one of the at least one peripheral device and the master device to the other of the at least one peripheral device and master device after the standard pairing process;
   transmitting radio frequency proximity pairing signals implementing the proximity pairing from the master device to the peripheral device, the proximity pairing signals being transmitted with a first level of transmission power, the first level of transmission power being less than a second level of transmission power used during the standard pairing process;
   identifying a signal strength of the proximity pairing signals; and
   disconnecting a connection established in the standard pairing process based on the signal strength of the proximity pairing signals being less than a predetermined threshold signal strength.

2. The method of claim 1 wherein the placing step includes placing the master device and the at least one peripheral device within twenty feet of each other.

3. The method of claim 1 wherein after the proximity pairing is complete, the peripheral device enters a sleep state and periodically wakes up to report to the master device, and if a predetermined number of the reports in succession are not received by the master device, then the master device sends a proximity pairing recovery packet to the peripheral device in order to implement proximity pairing recovery.

4. The method of claim 3 wherein the peripheral device replies to the master device in response to receiving the proximity pairing recovery packet, and if the proximity pairing is unsuccessful, then the master device reports to a user a loss of proximity pairing with the peripheral device.

5. The method of claim 1 wherein the master device comprises a wireless gateway and the at least one peripheral device comprises at least one patient monitoring sensor, the method comprising the further step of placing the wireless gateway and the at least one patient monitoring sensor on a patient's body.

6. The method of claim 5 comprising the further steps of:
   using the wireless gateway to collect data from the at least one patient monitoring sensor; and
   sending the collected data from the wireless gateway to a remote server at a remote health care center and/or to a local server at a local data processing center.

7. A wireless networking method, comprising the steps of:
   performing a standard wireless pairing procedure between a master device and a peripheral device, the wireless pairing procedure including the master device transmitting standard pairing signals to the peripheral device with a first level of transmission power;
   after performing the standard wireless pairing procedure, transmitting radio frequency proximity pairing signals implementing proximity pairing from the master device to the peripheral device, the proximity pairing signals being transmitted with a second level of transmission power, the second level of transmission power being less than the first level of transmission power;
   identifying a signal strength of the proximity pairing signals; and
   disconnecting a connection established in the standard wireless pairing procedure based on the signal strength of the proximity pairing signals being less than a predetermined threshold signal strength.

8. The method of claim 7 comprising the further step of placing the master device and the peripheral device within a predetermined distance of each other.

9. The method of claim 7 comprising the further step of transmitting a radio frequency request for proximity pairing from the peripheral device to the master device.

10. The method of claim 7 further comprising, after the proximity pairing is complete, the step of transmitting operational signals from the master device to the peripheral device.

11. The method of claim 7 wherein after the proximity pairing is complete, the peripheral device enters a sleep state and periodically wakes up to report to the master device, and if a predetermined number of the reports in succession are not received by the master device, then the master device sends a proximity pairing recovery packet to the peripheral device in order to implement proximity pairing recovery.

12. The method of claim 11 wherein the peripheral device replies to the master device in response to receiving the proximity pairing recovery packet, and if the proximity pairing is unsuccessful, then the master device reports to a user a loss of proximity pairing with the peripheral device.

13. The method of claim 7 wherein the master device sends a proximity pairing recovery packet to the peripheral device.

14. A wireless networking method, comprising the steps of:
   periodically transmitting synchronization beacons from a master device;
   placing the master device and a peripheral device within twenty feet of each other;
   receiving at the peripheral device at least one of the synchronization beacons from the master device;

implementing a standard pairing process between the master device and the at least one peripheral device;

transmitting a radio frequency request for proximity pairing from the peripheral device to the master device after the standard pairing process;

reducing a level of transmission power in the master device for proximity pairing;

transmitting a radio frequency request for confirmation of the radio frequency request for proximity pairing, the request for confirmation being transmitted from the master device to the peripheral device;

transmitting node identification information and security information from the master device to the peripheral device; and after the proximity pairing is complete, increasing the level of transmission power in the master device for future communication with the peripheral device.

15. The method of claim 14 wherein, before the placing step, the peripheral device is more than twenty feet away from the master device, the method comprising the further step of applying power to the peripheral device after the placing step.

16. The method of claim 14 comprising the further step of using the peripheral device to search for the synchronization beacons from the master device.

17. The method of claim 14 comprising the further step of storing pairing information in memory devices of the master device and the peripheral device, respectively.

18. The method of claim 14 wherein the at least one peripheral device comprises at least one patient monitoring sensor, the method comprising the further steps of:

placing the master device and the at least one patient monitoring sensor on a patient's body;

using the master device to collect data from the at least one patient monitoring sensor; and sending the data collected by the master device to a remote server at a remote health care center and/or to a local server at a local data processing center.

* * * * *